UNITED STATES PATENT OFFICE.

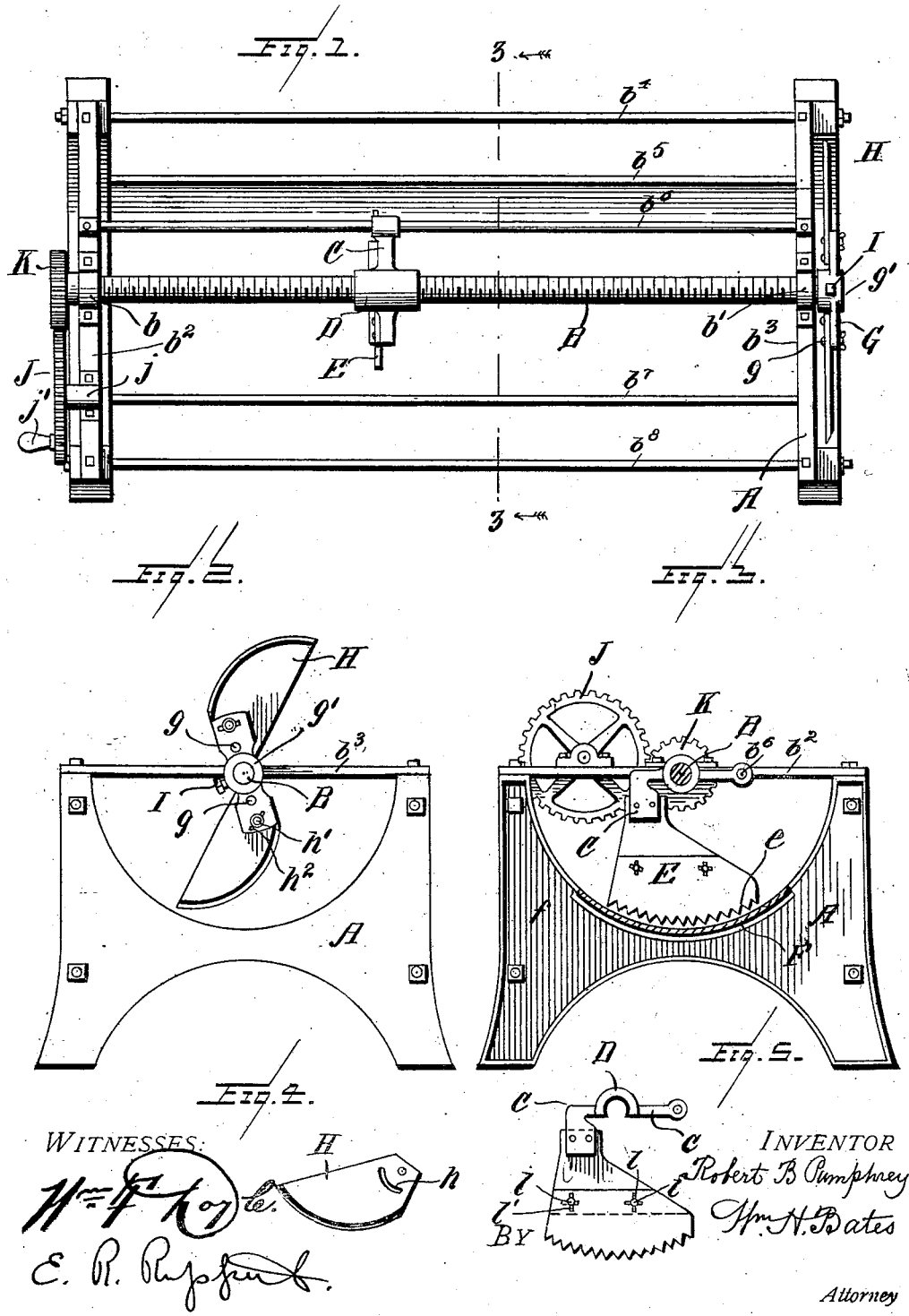

ROBERT B. PUMPHREY, OF BALTIMORE, MARYLAND.

MEAT-SLICING MACHINE.

No. 859,248.  Specification of Letters Patent.  Patented July 9, 1907.

Application filed September 20, 1906. Serial No. 335,504.

*To all whom it may concern:*

Be it known that I, ROBERT B. PUMPHREY, a citizen of the United States, residing at Baltimore city, in the State of Maryland, have invented certain new and useful Improvements in Meat-Slicing Machines, of which the following is a specification.

My invention relates to improvements in meat slicing machines, and it has for its object to simplify, improve and cheapen the cost of construction of this class of machines over the existing prior state of the art.

With these ends in view, the invention consists in the construction and combination of the several parts as will be hereinafter more in detail described and specifically claimed.

In the accompanying drawings which fully and clearly illustrate my invention: Figure 1 is a top or plan view of my machine. Fig. 2 is a front end view thereof. Fig. 3 is a rear end view. Fig. 4 is a detail view of one of the slicing knives, and Fig. 5 is a detail view of the meat feeder and feeding arm.

Similar letters of reference indicate corresponding parts in the several figures.

Referring to the drawings: A designates the frame of the machine upon which are supported the operating parts, the inner portion of which is dished out or of semicircular form to receive a slicing board of corresponding form and a meat feeder or holder for feeding the meat to a pair of revolving knives which will be hereinafter described.

B designates an operating feed screw shaft extending the full length of the machine and journaled in bearings $b$ $b'$ rigidly secured to two transverse cross pieces $b^2$ $b^3$ at each end of the machine. These end cross pieces $b^2$ $b^3$ have also transversely and rigidly secured to them a series of parallel rods $b^4$ $b^5$ $b^6$ $b^7$ $b^8$, the rod $b^6$ serving as a guide for the slidable end of a feed arm which slides freely upon said rod which will be also hereinafter described.

C designates a feed arm located transversely to the length of the shaft B, and D is a feed nut of semicircular form and which forms an integral part of said arm, the nut being correspondingly screw threaded upon its inner face and through which the shaft B is passed which mesh with each other to operate the feed arm as it travels on the shaft B, the said arm being loosely secured on the said shaft B and carrying a meat feeder or holder to which it is attached by which the meat is fed to a pair of knives hereinbefore stated.

E designates the meat feeder which is in the form of a sector, the lower portion of which is curved in contour and provided with teeth $e$, this feeder being rigidly secured to one and the angular end of the feeder arm C by means of rivets or in any suitable manner.

A slot $l'$ is formed centrally in the lower portion of the feed holder in which takes the lower edge of the upper portion of said feed holder, the two portions being secured together by means of set-screws $l$ $l$ engaging in cruciform slots $l'$ $l'$ by means of which the lower portion of the holder can be adjusted vertically or horizontally, as clearly shown in Fig. 5 of the drawing.

F designates a slicing board corresponding in form to the bottom of the machine and snugly located in offsets therein.

G designates an arm to which a pair of meat slicing knives H is secured by means of rivets $g$ $g$, said arm having integrally formed thereon a sleeve $g'$ and mounted upon one end of the traveling or operating shaft B; the edges of these knives are of curvilinear form, i. e., their cutting edges, and are arranged in opposite planes to each other, and pivotally secured at their inner ends to the said arm G, as at $g$ $g$. These knives have formed therein near their pivotal ends small curved slots $h$ within which pins $h'$ engage secured to the outer ends of the arm by pins $h^2$, the purpose of which is to allow for the required adjustment of the knives in different positions upon the arm G.

I designates a thumb screw which is passed through a perforation in the sleeve $g'$ of the arm G which provides for the simultaneous adjustment of the arm carrying the knives upon the operating screw shaft.

To the opposite end of the machine to that already described is provided a gear wheel J, secured upon the end of a short shaft $j$ journaled in the cross piece $b^2$ in the end of the machine having a crank handle $j'$ thereon, and meshing with the gear wheel J is a pinion K secured upon the end of the operating screw shaft B, which passes through the journal $b$ secured to the transverse end cross piece $b^2$ of the machine.

I desire it to be understood that I do not confine myself to the particular construction herein described, as I reserve the right to vary the same without departing from my invention.

From the foregoing description taken in connection with the accompanying drawing the operation of my machine will be obvious, but may be briefly rehearsed as follows: The operator grasps the handle of the machine and turns the same when motion is communicated to the operating screw shaft, causing the nut on the feed holder arm to travel thereon, carrying the holder until it gets approximately to the knives, where it is to be sliced, the slicing of the meat into varying thicknesses of the same being regulated by the adjustability of the meat feeder or holder before being sliced, the slicing being done against the slicing board fitted in the bottom of the machine.

Having thus described my invention, what I claim as new and desire to secure by Letters Patent is:

In a meat slicing machine, the combination with the supporting frame; of an operating screw-shaft, a feeder arm having a sleeve formed integral with one end, the opposite end having a right-angular portion, a slide rod passed through said sleeve upon which the latter slidably traverses, a screw threaded feed-nut formed integrally with the feeder arm, adjustable meat holder formed in sections and serrated upon its underside and secured to the right angular end of the feeder arm, a curved slicing board seated in the bottom of the machine, an adjustable knife carrying arm secured to the end of the feed-shaft, adjustable knives secured to said arm having their curved cutting edges in opposite planes a set screw for adjusting the knife carrying arm, and a pinion and gear wheel meshing with each other, the former secured to the end of the feed-shaft to that of the knife cutting arm, and the latter secured to the adjacent short shaft respectively upon the same end of the machine all arranged and operating substantially as described.

In testimony whereof I have signed my name to this specification in the presence of two subscribing witnesses.

ROBERT B. PUMPHREY.

Witnesses:
J. G. MORRIS,
WM. H. BATES.